United States Patent
Matsumoto et al.

(10) Patent No.: US 6,471,760 B1
(45) Date of Patent: Oct. 29, 2002

(54) ANTHRAPYRIDONE COMPOUNDS, WATER-BASED MAGENTA INK COMPOSITION, AND METHOD OF INK-JET RECORDING

(75) Inventors: Hiroyuki Matsumoto, Saitama (JP); Yasuo Murakami, Saitama (JP); Yasuo Shirasaki, Saitama (JP); Katsunori Fujii, Saitama (JP); Toru Tabei, Saitama (JP)

(73) Assignee: Nippon Kayaku Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/646,635

(22) PCT Filed: Mar. 23, 1999

(86) PCT No.: PCT/JP99/01436
§ 371 (c)(1),
(2), (4) Date: Sep. 20, 2000

(87) PCT Pub. No.: WO99/48981
PCT Pub. Date: Sep. 30, 1999

(30) Foreign Application Priority Data

Mar. 25, 1998 (JP) .......................... 10-095199
Aug. 7, 1998 (JP) .......................... 10-224776

(51) Int. Cl.$^7$ .................. C09D 11/00; C07D 221/18
(52) U.S. Cl. ...................... 106/31.47; 546/76
(58) Field of Search ................ 106/31.47; 546/76

(56) References Cited

U.S. PATENT DOCUMENTS

| | | | | |
|---|---|---|---|---|
| 2,756,234 A | * | 7/1956 | Elslager et al. | 540/344 |
| 2,759,939 A | | 8/1956 | Bucheler et al. | 260/272 |
| 2,962,497 A | | 11/1960 | Guenthard et al. | 260/249 |
| 4,740,581 A | * | 4/1988 | Pruett et al. | 524/602 |
| 4,902,798 A | * | 2/1990 | Nakamatsu et al. | 106/287.2 |
| 5,340,910 A | * | 8/1994 | Chamberlin et al. | 524/602 |
| 5,367,075 A | * | 11/1994 | Nakamatsu et al. | 546/76 |
| 6,152,969 A | * | 11/2000 | Matsumoto et al. | 546/76 |

FOREIGN PATENT DOCUMENTS

| | | | |
|---|---|---|---|
| JP | 57-197191 | 12/1982 | |
| JP | 57-195775 | 12/1985 | |
| JP | 02016171 A | * 1/1990 | ........... C09D/11/00 |
| JP | 2-127483 | 5/1990 | |
| JP | 2-132159 | 5/1990 | |
| JP | 3-100502 | 4/1991 | |
| JP | 8-29771 | 2/1996 | |

\* cited by examiner

*Primary Examiner*—Helene Klemanski
(74) *Attorney, Agent, or Firm*—Nields & Lemack (57) ABSTRACT

The present invention provides novel anthrapyridone compounds or salts thereof which have a magenta hue and vividness suitable for inkjet recording and give the recorded material having a high fastness in light fastness and water fastness. That is, the present invention relates to an anthrapyridone compound represented by Formula A-B or the salt thereof, wherein A is the dyestuff residue represented by Formula (1)

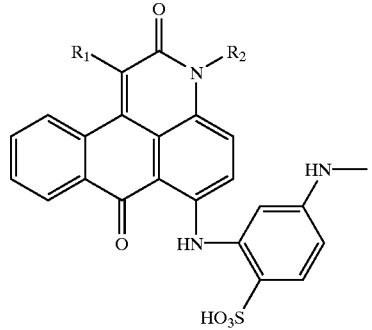

(1)

(in the formula, $R_1$ is hydrogen atom or an alkoxycarbonyl group and $R_2$ is hydrogen atom or methyl group); and B is hydrogen atom or a substituent group on the dyestuff residue A, a water-based magenta ink composition which includes the said compound and an inkjet recording method which uses the said compound.

15 Claims, 1 Drawing Sheet

Chromaticity Diagram

Fig.1

Chromaticity Diagram

ANTHRAPYRIDONE COMPOUNDS, WATER-BASED MAGENTA INK COMPOSITION, AND METHOD OF INK-JET RECORDING

TECHNICAL FIELD

The present invention relates to a novel anthrapyridone compound, a water-based magenta ink composition, and a method of ink-jet recording.

BACKGROUND ART

Diverse ink jetting processes have been developed for the recording method by means of ink-jet printer, and any process comprises generating ink droplets to deposit them onto various recording materials (such as paper, film, cloth) for recording. The recording method by means of ink-jet printer has rapidly been spread in recent years and will be propagated in future because the method brings about no noise due to the system in which a recording head does not contact with the recording material and because the method advantageously allows the printer to become downsized easily, to work in a high-speed and to give color printing. For recording an image information or a character information pictured on a computer color display in color by means of an ink-jet printer, the information is generally printed according to subtractive color mixing of inks of four colors, namely yellow(Y), magenta(M), cyan(C) and black(K). In order to print reproducibly an image pictured by additive color mixing of R, G ,B on a CRT display as faithfully as possible according to subtractive color mixing, the dyestuffs used, especially ones for a YMC ink, are desired to have color hues close to the respective standards of YMC ("Japan Color Standard Paper" published by Japan Printing Machinery Manufacturers Association) and vividness. Additionally, it is required that the resulting ink composition is stable for long-term storage and that the resulting printed image is of a high optical density and has excellent fastness including water fastness and light fastness. The present invention relates to a magenta ink.

Ink-jet printers are increasingly used in a wide range from a small one for OA to a big one for industrial use. So, excellence in fastness such as water fastness and light fastness of the printed image is more strictly demanded. The water fastness is substantially improved by coating inorganic micro particles such as porous silica, which can absorb dyestuff from ink, on a paper sheet with PVA resin. Various coated sheets for ink-jet printing are already available on the market. But light fastness is not yet improved by an established technique. Of tetrachromatic colors of YMCK, magenta especially has many dyestuffs which are naturally weak in light fastness, and the improvement is an important problem to be solved.

The chemical skeletal structure of magenta dyestuffs used in a water-soluble ink for ink-jet recording is represented by a xanthene type disclosed by JP Laid-Open No. 89811/1979, JP Laid-Open No. 60053/1996 and JP Laid-Open No. 143798/1996, or an azo type using- the H acid disclosed by JP Laid-Open No. 62562/1986, JP Laid-Open No. 156168/1987, JP Laid-Open No. 203970/1991, JP Laid-Open No. 157698/1995 and JP Publication No. 78190/1995. The xanthene type is indeed excellent in hue and vividness, but is inferior in light fastness. The azo type using the H acid is good in hue and water fastness, but is inferior in light fastness and vividness. As disclosed by JP Laid-Open No. 203970/1991, for example, some magenta dyestuffs being excellent in vividness and light fastness have been developed, but are still inferior in light fastness to the other hue dyestuffs such as yellow dyestuffs and cyan dyestuffs represented by copper phthalocyanine type.

Alternatively, for a chemical skeletal structure of magenta dyes excellent in vividness and light fastness, an anthrapyridone type is known as disclosed by JP Laid-Open No. 74173/1984 and JP Laid-Open No. 16171/1990, but can not yet show any satisfactory properties in hue, vividness, light fastness, water fastness and stability in solution.

A object of the present invention is to provide a water-based magenta ink composition which has a wide range of blend color in hue and vividness suitable for ink-jet recording and supplies the recorded material with a high fastness in light fastness and water fastness.

DISCLOSURE OF THE INVENTION

The present inventors made a diligent study to solve the above problem and, as a result, have completed the present invention. Namely, the present invention is as follows:

(1) An anthrapyridone compound represented by Formula A-B or the salt thereof, wherein A is the dyestuff residue represented by Formula (1)

(1)

(In the formula, $R_1$ is hydrogen atom ,an alkoxycarbonyl group or a benzoyl group and $R_2$ is hydrogen atom or methyl group); and B is hydrogen atom or a substituent group on the dyestuff residue A.

(2) An anthrapyridone compound or the salt thereof according to term (1). wherein said B is an acyl group, a substituted or unsubstituted benzene sulfonyl group, a substituted or unsubstituted alkyl sulfonyl group, or a group represented by Formula (2)

(2)

(In the formula, each X and Y is independently chlorine atom, hydroxyl group, amino group, monoethanolamino group, diethanolamino group, morpholino group or anilino group (which may have one or more substituent selected from the group consisting of sulfonate group, carboxyl group, methyl group and chlorine atom)).

(3) An anthrapyridone compound or the salt thereof according to term (2), wherein said X is anilino group (which may have one or more substituent selected from the group consisting of sulfonate group and-carboxyl group), and Y is chlorine atom, hydroxyl group, amino group, monoethanolamino group, diethanolamino group or morpholino group.

(4) An anthrapyridone compound or the salt thereof according to term (2), wherein B is benzene sulfonyl group, tosyl group, 2-carboxy-benzoyl group or 3,4-dicarboxy-benzoyl group.

(5) An anthrapyridone compound or the salt thereof according to term (1), wherein said $R_1$ is hydrogen atom; $R_2$ is methyl group.

(6) A water-based magenta ink composition which comprises containing the anthrapyridone compound or the salt thereof according to any one of term (1) to (5).

(7) A water-based magenta ink composition according to term (6), wherein said composition contains water and an organic solvent.

(8) A water-based magenta ink composition according to term (6) or (7), wherein the content of inorganic salt included in said anthrapyridone compound or the salt is 1% by weight or less.

(9) A water-based magenta ink composition according to any one of term (6) to (8), wherein said composition is prepared for ink-jet recording.

(10) A method for ink-jet recording which comprises using the water-based magenta ink composition according to any one of term (6) or (8) as an ink, in the recording way that ink droplets are ejected responding to record signals to record onto a recording material.

(11) A method for ink-jet recording which comprises using both the water-based magenta ink composition according to any one of term (6) or (8) as an magenta ink and a water-based ink containing water-soluble metal phthalocyanine dyestuff as a cyan ink, in the recording way that ink droplets are ejected responding to record signals to record onto a recording material.

(12) A method for ink-jet recording according to term (11), wherein said recording material is an information transmission sheet.

(13) A method for ink-jet recording according to term (12), wherein said information transmission sheet is a surface-treated sheet.

(14) An ink-jet printer which comprises being equipped with both a container receiving the water-based magenta ink composition according to any one of term (6) or (8) and a container receiving the water-based cyan ink composition containing water-soluble metal phthalocyanine dyestuff.

(15) An anthrapyridone compound or the salt according to term (1), wherein $R_1$ is hydrogen atom or a lower alkoxycarbonyl group; $R_2$ is methyl group: and B is hydrogen atom or a C1–C4 alkoxycarbonyl group.

DESCRIPTION OF SYMBOLS

Figure 1:
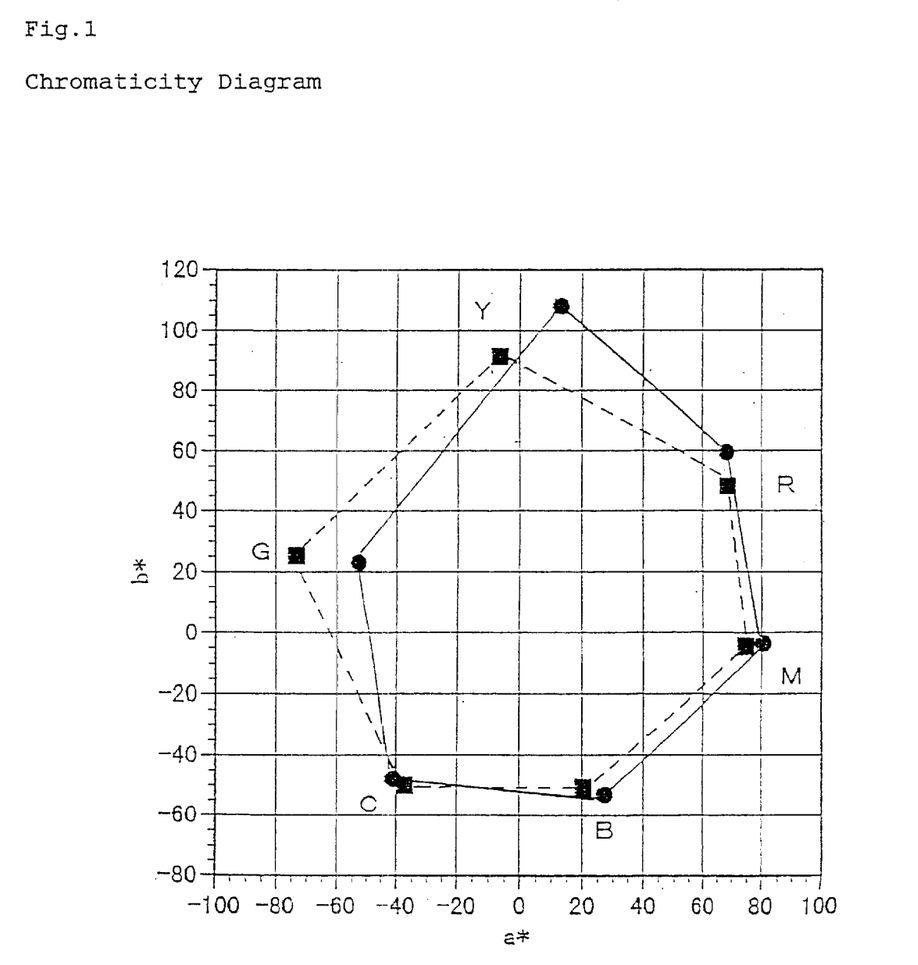
FIG. 1 depicts an example of chromaticity diagram expressing the color ranges by the compound of the present invention as well as the dye of a Reference.

In FIG. 1, the axis X represents a* and the axis Y represents b* on the L* a* b* colorimetric system. Y shows yellow, R shows red, M shows magenta, B shows blue, C shows cyan and G shows green. The solid line expresses the range of blend color by the compound of Example 2 and the dotted line expresses the range of blend color by the standard in "Japan Color Standard Paper". The plot G in the solid line shows blend color (Reference value) obtained by printing C.I.Direct Yellow 86 and C.I.Direct Blue 199 overlapped.

BEST MODE FOR CARRYING OUT THE INVENTION

The novel anthrapyridone compound of the present invention is represented by Formula A-B. A is the dyestuff residue represented by Formula (1), and B is hydrogen atom or a substituent group on the dyestuff residue A. Namely, the present invention is an antrapyridone compound characterized by having the group represented by Formula (1) as the dyestuff residue. The anthrapyridone compound, which has the group represented by Formula (1) as the dyestuff residue, is preferably a water-soluble compound used for a magenta (bluish red) dyestuff component.

The alkoxycarbonyl group in R 1 includes a C1–B4 alkoxycarbonyl group such as methoxycarbonyl group, ethoxycarbonyl group, n-propoxycarbonyl group, isopropoxycarbonyl group, and n-butoxycarbonyl group.

The substituent group represented by B on the dyestuff residue A is not particularly limited provided that it is able to substitute on a nitrogen atom. It includes an acyl group, a substituent represented by Formula (2) and a C1–C4 alkyl group which may has substituents.

The preferable example of the dyestuff residue A can be presented when $R_1$ is hydrogen atom and $R_2$ is methyl group in Formula (1).

B includes a substituted or unsubstituted benzensulfonyl group, a substituted or unsubstituted alkylsulfonyl group, a substituted or unsubstituted benzoyl group, and a substituted or unsubstituted alkoxycarbonyl group. The substituent group on the benzene nucleus in these above groups includes a lower (C1–C4) alkyl group, phenyl group, a halogen atom, nitro group, amino group, hydroxy group, and carboxyl group: and may additionally have a substituent group as shown above if possible. A substituent group on the alkyl group includes the substituent group on the benzene nucleus as shown above other than the alkyl group. B includes benzenesulfonyl group; a lower alkyl-substituted benzenesulfonyl group such as tosyl; a halogenobenzenesulfonyl group such as 4-chloro benzenesulfonyl group and 4-bromobenzensulfonyl group; a (C1–C4) alkylsulfonyl group such as methylsulfonyl group and ethylsulfonyl group; a optionally substituted benzoyl group such as benzoyl group and 3,4-dicarboxybenzoyl group; a lower alkylcarbonyl group such as phenylacetyl group and acethyl group; a (C1–C4) alkoxycarbonyl group such as methoxycarbonyl group, ethoxycarbonyl group, propoxycarbonyl group, butoxycarbonyl group and benzyloxycarbonyl group.

The anilino group, which may have one or more substituents selected from the group consisting of sulfonate group, carboxyl group, methyl group and chlorine atom, includes 2,5-disulfoanilino group, 3-sulfoanilino group, 2-sulfoanilino group, 4-sulfoanilino group, 2-carboxy-4-sulfoanilino group and 2- carboxy-5-sulfoanilino group.

X in Formula (2) is preferably an anilino group which may have one or more substituents, more preferably an anilino group having at least one sulfonate group.

The preferable Y is amino group or hydroxy group.

The preferable anthrapyridone compound represented by Formula A-B of the present invention can be presented when $R_1$ is hydrogen atom or a lower alkoxycarbonyl group, more preferably hydrogen atom; and $R_2$ is methyl group in Formula (1); and B is represented by Formula (2) wherein X is an ailino group having at least one sulfonyl group and Y is hydroxy group or amino group.

The anthrapyridone compound and the salt thereof, in which $R_1$ is hydrogen atom or a lower alkoxycarbonyl group; $R_2$ is methyl group; and B is hydrogen atom or a lower (C1–B4) alkoxycarbonyl group, is important as an intermediate for synthesizing the other anthrapyridone compounds of the present invention.

The typical examples of the anthrapyridone compound represented by Formula A-B of the present invention are shown in Table 1. In Table 1, (S) means sulfonate group, 2(S) means disulfonete group, (K) means carboxy group, 2(K) means dicaraboxy group, E means ethoxycarbonyl group, M means methoxycarbonyl group, Ph means phenyl group and Bz means benzoyl group.

TABLE 1

| | A Formula (1) | | | Formula (2) | |
|---|---|---|---|---|---|
| No. | $R_1$ | $R_2$ | B | X | Y |
| 1 | H | $CH_3$ | $COCH_3$ | | |
| 2 | H | $CH_3$ | H | | |
| 3 | H | $CH_3$ | | 2,5-2(S)-anilino | Cl |
| 4 | H | $CH_3$ | | 2,5-2(S)-anilino | OH |
| 3 | H | $CH_3$ | | 2,5-2(S)-anilino | $NH_2$ |
| 6 | H | $CH_3$ | | 2,5-2(S)-anilino | morpholino |
| 7 | H | $CH_3$ | | 2,5-2(S)-anilino | di(hydroxyethyl)amino |
| 8 | H | $CH_3$ | | 2,5-2(S)-anilino | hydroxyethylamino |
| 9 | H | $CH_3$ | | 3-(S)-anilino | Cl |
| 10 | H | $CH_3$ | | 3-(S)-anilino | OH |
| 11 | H | $CH_3$ | | 2-(S)-anilino | Cl |
| 12 | H | $CH_3$ | | 2-(S)-anilino | OH |
| 13 | H | $CH_3$ | | 4-(S)-anilino | Cl |
| 14 | H | $CH_3$ | | 4-(S)-anilino | OH |
| 15 | H | $CH_3$ | | 2-(K)-4-(S)-anilino | Cl |
| 16 | H | $CH_3$ | | 2-(K)-4-(S)-anilino | OH |
| 17 | H | $CH_3$ | | 2-(K)-4-(S)-anilino | $NH_2$ |
| 18 | H | $CH_3$ | | 2-(K)-5-(S)-anilino | Cl |
| 19 | H | $CH_3$ | | 2-(K)-5-(S)-anilino | OH |
| 20 | H | $CH_3$ | | 2-(K)-5-(S)-anilino | $NH_2$ |
| 21 | E | $CH_3$ | | 2,5-2(S)-anilino | Cl |
| 22 | E | $CH_3$ | | 2,5-2(S)-anilino | OH |
| 23 | M | H | | 2,5-2(S)-anilino | Cl |
| 24 | M | H | | 2,5-2(S)-anilino | OH |
| 25 | H | $CH_3$ | | 2,5-2(S)-anilino | 2,5-2(S)-anilino |
| 26 | H | $CH_3$ | | 2,5-2(S)-anilino | 2-(S)-anilino |
| 27 | H | $CH_3$ | $CH_3PhSO_3$ | | |
| 28 | H | $CH_3$ | $PhSO_3$ | | |
| 29 | H | $CH_3$ | Bz | | |
| 30 | H | $CH_3$ | 3,4-2(K)-Bz | | |
| 31 | H | $CH_3$ | $CH_3PhSO_3$ | | |
| 32 | H | $CH_3$ | $4$-Cl-$PhSO_3$ | | |
| 33 | H | $CH_3$ | Ph-$CH_2$CO | | |
| 34 | H | $CH_3$ | $C_2H_5$OCO | | |
| 35 | H | $CH_3$ | Ph-$CH_2$OCO | | |
| 36 | E | $CH_3$ | $CH_3PhSO_3$ | | |
| 37 | E | $CH_3$ | $PhSO_3$ | | |
| 38 | E | $CH_3$ | Bz | | |
| 39 | E | $CH_3$ | 3,4-2(K)-Bz | | |
| 40 | E | $CH_3$ | $CH_3PhSO_3$ | | |
| 41 | E | $CH_3$ | $4$-Cl-$PhSO_3$ | | |
| 42 | E | $CH_3$ | $PhCH_2$CO | | |
| 43 | E | $CH_3$ | $C_2H_5$OCO | | |
| 44 | E | $CH_3$ | $PhCH_2$OCO | | |
| 45 | E | $CH_3$ | $CH_3$CO | | |
| 46 | E | $CH_3$ | H | | |
| 47 | Bz | $CH_3$ | | 2,5-2(S)-anilino | OH |
| 48 | E | $CH_3$ | 2(K)-Bz | | |

The anthrapyridone compound of the present invention can be produced, for example, by a following procedure.

Namely, the anthrapyridone bromo-compound represented by Formula (3)

(3)

(in the formula, $R_1$ and $R_2$ are same as described before) can be condensed with 5-acetylamino-2-sulfoaniline by the Ullmann reaction to obtain the above No.1 compound. The acetyl group of the obtained compound is then removed by hydrolysis to obtain the above No.2 compound that appears when B is hydrogen atom.

In order to obtain a compound in which B is the substituent represented by Formula (2) and X is the other group than chlorine atom and hydroxyl group, the compound responding to said other group, for example, an amine compound such as aniline, is condensed with 2,4,6-trichloro-s-triazine (cyanuric chloride) to give the responding first condensate, which is then condensed with the No.2 compound to give the second condensate wherein X is for example the responding amino group and Y is chlorine atom. The second condensate is hydrolyzed to obtain the compound wherein Y is hydroxyl group. Furthermore, in order to obtain a compound in which Y is the other group than chlorine atom and hydroxyl group, the above second condensate wherein Y is chlorine atom is condensed with a responding amine compound for the third condensation.

In order to obtain a compound in which B is the other group than the substituent represented by Formula (2), the No.2 compound is satisfactorily reacted with an acylating agent. The acylating agent, which is for example an acyl chloride responding to the above acyl group, includes a substituted or unsubstituted benzenesulfonyl chloride, a substituted or unsubstituted alkylsulfonyl chloride, a substituted or unsubstituted benzoyl chloride, and a substituted or unsubstituted alkoxycarbonyl chloride; to be concrete, benzenesulfonyl chloride, toluenesulfonyl chloride, 4-chlorobenzenesulfonyl chloride, 4-bromobenzenesulfonyl chloride, methylsulfonyl chloride, ethylsulfonyl chloride, benzoyl chloride, 3,4-dicarboxybenzoyl chloride, phenylacetic acid chloride, acetic acid chloride, methoxycarbonyl chloride, ethoxycarbonyl chloride, prooxycarbonyl chloride, butoxycarbonyl chloride and benzyloxycarbonyl chloride.

The compound thus obtained exists as a free acid or the salt thereof. The alkali metal salt, the alkali earth metal salt, the alkylamine salt, the alkanolamine salt or the ammonium salt may be used in the present invention. The preferable salt includes an alkali metal salt such as the sodium salt, the potassium salt and the lithium salt; an alkanolamine salt such as the monoethanolamine salt, the diethanolamine salt, the triethanolamine salt, the monoisopropanolamine salt, the diisopropanolamine salt and the triisopropanolamine salt; and the ammonium salt.

The water-based magenta ink composition of the present invention can be obtained by dissolving the compound represented by Formula A-B or the salt thereof in water or a hydrous solvent (an organic solvent containing water will be described later). The preferable ink pH is about 6 to 11. For use in an ink-jet recording printer, it is preferable to use a water-based ink composition whose dyestuff component contains an amount as little as possible of an inorganic material such as the chloride and the sulfate of a metal positive ion. For example, the total content of sodium chloride and sodium sulfate in the dyestuff component is 1% by weight or less relative to the total amount of a compound represented by Formula A-B or the salt thereof.

In order to produce the dyestuff component (a compound represented by Formula A-B or the salt thereof) of the present invention having a low content of inorganic salt, it is sufficient to conduct a desalting treatment, for example, by a conventional method such as reverse osmotic membrane or by stirring a dry product or a wet cake of the anthrapyridone of the present invention in a mixed solvent of methanol and water, then filtering and drying. The alcohol content of the mixed solvent in the latter treatment is 30% by weight to 95% by weight, preferably 40% by weight to 85% by weight relative to the total mixed solvent. The amount of the mixed solvent is not limited, but is generally 1 to 200 times by volume, preferably 2 to 100 times by volume that of the wet cake.

The content of NaCl and $Na_2SO_4$ in inorganic salts can be determined, for example, through measuring $Cl^-$ and $SO_4^{2-}$ respectively according to ion chromatography. Heavy metals can be determined according to atomic absorption spectrometry or Inductively Coupled Plasma (ICP) emission spectrometry; $Ca^{2+}$ and $Mg^{2+}$ can be determined according to ion chromatography, atomic absorption spectrometry or CIP emission spectrometry.

The water-based ink composition of the present invention is prepared by using water as a medium, containing the anthrapyridone compound or the salt thereof preferably by 0.1 to 20% by weight, more preferably by 1 to 10% by weight, more preferably 2 to 8% by weight. The water-based ink composition of the present invention also may contain a water-soluble organic solvent by 60% by weight or less, preferably 50% by weight, more preferably 40% or less, especially preferably 30% or less. The lower limit may be 0% by weight, but is generally 5% or more, more preferably 10% by weight or more, most preferably 10 to 30% by weight. The water-based ink composition of the present invention may contain ink regulators by 0 to 10% by weight, preferably 5% by weight or less. The remainder except the above components is water.

The usable water-soluble organic solvent includes a C1–C4 alkanol such as methanol, ethanol, propanol, isopropanol, butanol, isobutanol, secondary butanol and tertiary butanol; a carboxylic amide such as N,N-dimethylformamide and N,N-dimethylacetoamide; a lactam such as ε-caprolactam and N-methylpyrrolidin-2-one; urea; a cyclic urea such as 1,3-dimetylimidazolidin-2-one or 1,3-dimethylhexahydropyrimid-2-one; a ketone or a keto-alcohol such as acetone, methyl ethyl ketone, and 2-methyl-2-hydroxypentan-4-one; an ether such as tetrahydrofuran and dioxane; mono-, oligo- or poly-alkylene glycol or thioglycol having C2–C6 alkylene units, such as ethylene glycol, 1,2- or 1,3-propylene glycol, 1,2- or 1,4-butylene glycol, 1,6-hexylene glycol, diethylene glycol, triethylene glycol, dipropylene glycol, thiodiglycol, polyethylene glycol and polypropylene glycol; polyols (triols) such as glycerin and hexane-1,2,6-triol; C1–C4 alkyl ethers of polyhydric alcohols, such as ethylene glycol monomethyl ether, ethylene glycol monoethyl ether, diethylene glycol monomethyl ether, diethylene glycol monoethyl ether, triethylene glycol monomethyl ether, and triethylene glycol monoethyl ether; γ-butyrolactone; and dimethylsulfoxide. These solvents may be used in a combination of the two or more.

The effective examples of water-miscible organic solvents are N-methylpyrrolidin-2-one and mono-, di- or tri-alkylene glycol having C2–C6 alkylene units, preferably mono-, di- or triethylene glycol, dipropylene glycol, glycerine, and dimethylsulfoxide. N-methylpyrrolidin-2-one, ethylene glycol, diethylene glycol, N-methyl-2-pyrrolidone, glycerine, and dimethylsulfoxide are especially preferably used.

The ink regulators, which are all the components except water, a dyestuff component and a water-soluble organic solvent, include a preservative, a pH adjusting agent, a chelating agent, a rust preventive, a water-soluble ultraviolet absorbing agent, a water-soluble polymeric compound, a dyestuff dissolving agent, and a surfactant. The preservative includes sodium dehydroacetate, sodium sorbate, sodium 2-pyridinethiol-1-oxide, sodium benzoate and sodium pentachlorophenol. The pH adjusting agent includes any substance that can control the ink pH within a range of 6 to 11 with no adverse effect on the ink preparation. The examples are alkanolamines such as diethanolamine and triethanolamine; alkali metal hydroxides such as lithium hydroxide, sodium hydroxide, and potassium hydroxide; ammonium hydroxide; or alkali metal carbonates such as lithium carbonate, sodium carbonate and potassium carbonate. The chelating reagent includes sodium ethylenediaminetetraacetate, sodium nitrilotriacetate, sodium hydroxylethylenediaminetriacetate, sodium diethylenetriaminepentaacetate, and sodium uramil diacetate. The rust preventive includes acidic hyposulfite salts, sodium thiosulfate, ammonium thioglycolate, diisopropylammonium nitrite, tetranitrate pentaerythritol, and dicyclohexylammonium nitrite.

The ink composition of the present invention is prepared by adding the above dyestuff and the above water-soluble organic solvent and the ink regulators as necessary into water such as distilled water containing no impurities and mixing them together. Alternatively, the dyestuff may be added in a mixture of water, the above water-soluble organic solvent and the ink regulators to dissolve. The resulting ink composition may be filtered, if necessary, to remove the contaminants from the composition.

A recording material used in ink-jet recording includes an information transmission sheet such as paper and film, fiber and leather. The information transmission sheet is defined to be a printing sheet that requires no special pre-treatment for printing and no post-treatment after printing by an ink-jet printer.

It is preferable that the information transmission sheet is surface-treated and, practically, is coated with an ink-acceptable layer on the basement material. The ink-acceptable layer can be supplied, for example, by impregnating or coating a cationic polymer on the above basement material; or by coating an inorganic fine-grain being enable of absorbing the dyestuff from an ink such as porous silica, alumina sol and special ceramic together with a hydrophilic polymer such as polyvinyl alcohol and polyvinyl pyrrolidone on the above basement material. The sheet supplied with the ink-acceptable layer is generally called an ink-jet special paper (film) or a glossy paper (film), and is available on the market, for example, as Pictorico (by Asahi Glass KK), Color BJ Paper, Color BJ Photofilm sheet (by Canon KK), Color Image Jet special paper (by Sharp KK), Superfine special glossy film (by Seiko Epson KK) and Pictafine (by Hitachi Maxell KK). The sheet can be of course used for a plain paper.

A method for ink-jet recording of the present invention can be carried out, for example, by setting an ink-jet printer with the container containing the above water-base magenta ink composition, and then recording conventionally on a recording material. The ink-jet printer includes a piezo type printer using mechanical vibration and a bubble-jet type printer using bubbles generated by heating.

In the method for ink-jet recording of the present invention, the above water-based magenta ink composition is generally used together with a yellow ink composition, a cyan ink composition, and a black ink composition as necessary. The cyan ink composition, if it contains a soluble metal phthalocyanine dyestuff, is used together with the above water-based magenta ink composition to give a favorable result that the color tone hardly changes in a light fastness test after color-mixing. Metals in the water-soluble metal phthalocyanine dyestuff includes copper, nickel and aluminium, and copper is preferable. The water-soluble copper phthalocyanine dyestuff includes C.I.direct blue86, C.I.direct blue87, C.I.direct blue199, C.I.acid blue249, C.I.reactive blue7, C.I.reactive blue15, C.I.reactive blue21 and C.I.reactive blue71.

The water-based cyan ink composition containing the water-soluble metal phthalocyanine dyestuff is produced, for example, by a method similar to that for the above water-based magenta ink composition. being injected in a container, which is set at the prescribed position of an ink-jet printer to use in the same way as another container containing the above water-based magenta ink composition is.

The water-based ink composition of the present invention can give an ideal magenta color which has vividness, color tone close to that indicated in the above "Japan Color Standard Paper published by Japan Printing Machinery Manufacturers Association", high tinge and moderate blueness, and therefore, can be used together with a yellow or cyan ink to give a wide visible range of color tone. Further, the composition, if used together with an existing yellow, cyan or black ink which is selected to be excellent in light fastness and water fastness, can provide a recorded product with excellence in light fastness and water fastness.

EXAMPLE

The present invention will be described below in more details with reference to Example. "part" and "%" in the description are shown by weight unless otherwise specified.

Example 1

(1) To 450 parts of N,N-dimethylformamide were 51.0 parts of the compound represented by Formula 3($R_1$=H, $R_2$=$CH_3$), 23.9 parts of sodium carbonate, 18.0 parts of cupric acetate monohydrate, and 114.0 parts of 5-acetylamino-2-sulfoaniline added one after another under stirring, followed by increasing the temperature. The solution was put at 130–135° C. for 3 hrs to react, cooled, stirred at 20° C. for 30 min, filtered, washed with 300 parts of methanol, and dried to obtain 62.9 parts of the No.1 compound as a red crystal.

To 471 parts of water was 513 parts of 96% sulfuric acid added dropwise to prepare 50% sulfuric acid, into which 61.3 parts of the No.1 compound was added. The solution was heated under reflux (at 123° C.) for 3 hrs to react, stirred under cooling (at about 25° C.) for 1 hr, filtered, washed with 120 parts of water to obtain a red wet cake. The wet cake was added gradually under stirring into a mix solution of 2000 parts of water and 80 parts of 24% aqueous sodium hydroxide. The solution was stirred at the ambient temperature for 1 hr, filtered to remove a little insoluble matter. To the filtrate was 100 parts of sodium chloride added under stirring. The solution was stirred at the ambient temperature for 1 hr, filtered, and dried to obtain the No.2 compound as a red crystal.

(2) To 100 parts of ice water was 0.25 parts of Lipal OH (a nonionic surfactant, by Lion KK) added to dissolve and 10.1 parts of cyanuric chloride then added, followed by stirring for 15 min. To the solution was 18.0 parts of 2,5-disulfoaniline monosodium salt (purity 85.5%) added at 8–100° C., followed by dropping 10% aqueous sodium carbonate at the same temperature to maintain the pH to 2.7–3.0 for 4 hrs for the first condensation reaction to obtain the solution containing the first condensate between cyanuric chloride and 2,5-disulfoaniline.

(3) To the reaction solution of (2) was 23.5 parts of the No.2 compound obtained in (1) added, followed by increasing the temperature and dropping 10% aqueous sodium carbonate at 60–65° C. to maintain the pH to 4.3–4.7 for 1 hr for the reaction. The solution was maintained for 30 min at the pH 7–7.2, filtered to remove a little insoluble matter, and diluted with water to a liquid amount of 600 parts. To the solution was 72 parts of sodium chloride added under heating to maintain the temperature to 55–60° C., followed by stirring. After 1 hr, the crystal was filtered to separate, washed with 75 parts of 10% aqueous sodium chloride, and dried to obtain 43.2 parts of the No.3 compound as a red crystal (sodium chloride content 33.7%, mirabilite content 0.1%).

(4) To a mix solution of 400 parts of water and 400 parts of methanol was 10.0 parts of the No.3 compound obtained in (3) added, followed by stirring under reflux for 1 hr to dissolve and cooling on ice to deposit a clear red crystal. After stirring for 1 hr, the crystal was filtered to separate, washed with 100 parts of methanol, and dried to obtain 6.4 parts of the desalted product of the No.3 compound (sodium chloride content 0.3%, mirabilite content 0.1% or less). λmax:526 nm (in water).

(5) The desalted product of the No.3 compound was conventionally used to prepare an ink, with which an image was printed out on the special paper (made by Canon KK) using an ink-jet printer. The test showed that the recorded image had a good water fastness and light fastness.

Example 2

(1) 9 parts of the No.3 compound obtained in Example (3) was added in 180 parts of hot water having a temperature of about 80° C. To the solution was 10% aqueous sodium hydroxide added dropwise, followed by maintaining the pH to 11 at 85° C. for 2 hrs for the reaction. To the solution, after adjusting to a liquid amount of 250 parts, was 50 parts of sodium chloride added at 55–60° C., followed by maintaining the temperature to 55–60° C. for 2 hrs. A deposited crystal was filtered to separate, and dried to obtain 7.6 parts of the No.4 compound as a red crystal.

(2) To 100 parts of water was 5.0 parts of the No.4 compound obtained in (1) added to dissolve and then 200 parts of methanol added, followed by stirring at 50–55° C. for 1 hr. A crystal was filtered and dried to obtain 3.3 parts of the desalted product of the No.4 compound as a red crystal. λmax:526 nm (in water).

(3) The desalted product of the No.3 compound was conventionally used to prepare an ink, with which an image was printed out on the special paper (made by Canon KK) using an ink-jet printer. The test showed that the recorded image had a good water fastness and light fastness.

Example 3

(1) 11.7 parts of the No.2 compound obtained in Example (1)was added in 125 parts of pyridine and heated at 80° C. To the solution was 9.6 parts of p-toluenesulfonyl chloride added for 10 min, followed by maintaining the temperature to 100° C. for 2 hrs for the reaction and cooling on water. A crystal was filtered, washed with water and dried to obtain 12.2 parts of the No.27 compound as a red crystal.

(2) To 200 parts of water was 6.0 parts of the No.27 compound obtained in (1) added and then 2.4 parts of 24% aqueous sodium hydroxide added to adjust the pH to 11.5, followed by stirring for 1 hr. To the solution, after adjusting to a liquid amount of 300 parts, was 22.5 parts of sodium chloride added, followed by stirring for 1 hr and then filtering to obtain 16 parts of a wet cake. The wet cake was heated under ref lux with 150 parts of methanol and 75 parts of water. After 1 hr, the solution was filtered to remove a little insoluble matter, and stirred under cooling on ice for 1 hr. The deposited crystal was filtered to separate, washed with a small amount of methanol and dried to obtain 4.0 parts of the desalted product of the No.27 compound as a red crystal.

Example 4

(1) To 250 parts of N,N-dimethylformamide were 30.9 parts of the compound represented by Formula 3 ($R_1$=ethoxycarbonyl group, $R_2$=$CH_3$), 15.5 parts of potassium carbonate, 9.0 parts of cupric acetate monohydrate, and 53.0 parts of 5-acetylamino-2-sulfoaniline added one after another under stirring, followed by increasing the temperature to 110° C. during 1 hr. The solution was put at 110–120° C. for 3 hrs to react, cooled, poured into 2200 parts of water, stirred at 20 for 1 hr, filtered to remove a little insoluble matter. The filtrate was diluted with water to a liquid amount of about 3000 parts. To the solution was 450 parts of sodium chloride added under stirring, followed by stirring at the ambient temperature for 1 hr. The deposited crystal was filtered to separate and dried to obtain 32.9 parts of the No.45 compound as a red crystal.

(2) To 145 parts of water was 156 parts of 96% sulfuric acid added dropwise under cooling to prepare 50% sulfuric acid, into which 32.7 parts of the No.45 compound was added. The solution was heated to increase the temperature to 75° C. during 1 hr, and put at 75–80° C. for 10 hrs to react. The reaction solution was cooled, poured into 400 parts of ice water, stirred at 20° C. for 1 hr, filtered and dried to obtain 25.4 parts of the No.46 compound.

(3) To 100 parts of pyridine was 10.4 parts of the No.46 compound added under stirring, followed by increasing the temperature to 90° C. To the solution was 6.9 parts of p-toluenesulfonyl chloride added during 30 min. The solution was put at 90–100° C. for 3 hrs to react, cooled, filtered to remove a little insoluble matter, poured into 350 parts of 10% sulfuric acid, and stirred at 20° C. for 1 hr. The deposited crystal was filtered, and dried to obtain 13.5 parts of the No.36 compound as a red crystal.

Example 5

(1) To 100 parts of ice water was 0.25 parts of Lipal OH added to dissolve and 10.1 parts of cyanuric chloride then added, followed by stirring for 15 min. To the solution was 14.0 parts of 5-sulfoanthranylic acid (purity 88.4%) added at 8–10° C., followed by dropping 10% aqueous sodium hydroxide at the same temperature to maintain the pH to 2.7–3.0 for 3 hrs for the first condensation reaction to obtain a reaction solution containing the first condensate between cyanuric chloride and 5-sulfoanthranylic acid.

(2) To the reaction solution of the above (1) was 23.5 parts of the No.2 compound obtained in Example 1(1) added, followed by increasing the temperature and dropping 10% aqueous sodium hydroxide at 60–65° C. to maintain the pH to 4.3–4.7 for 2 hrs to react. The solution was filtered to remove a little insoluble matter to obtain a reaction solution containing the No.15 compound.

(3) To the reaction solution containing the No.15 compound obtained in the above (2) was water added to dilute the liquid amount to 600 parts, followed by dropping 10% aqueous sodium hydroxide to maintain the pH to 10.5 at 90° C. for 2 hrs to react. To the solution, after adjusting to a liquid amount of 800 parts, was a concentrated hydrochloric acid added dropwise at 55–60° C. to adjust the pH to 2.7, followed by maintaining for 1 hr. The deposited crystal was filtered to obtain a wet cake, which was heated together with 500 parts of methanol under stirring and maintained at 60° C. for 1 hr. The crystal was filtered to separate, washed with 100 parts of methanol and dried to obtain 36.0 parts of the desalted product of the No.16 compound as a red crystal. λmax:520 nm (as an ammonium salt in the aqueous solution).

(4) The desalted product of the No.16 compound was conventionally used to prepare an ink, with which an image was printed out on the special paper (made by Seiko-Epson KK) using an ink-jet printer. The test showed that the recorded image had a good water fastness and light fastness. Furthermore, it showed favorably no color change with alkali.

Example 6

(1) 10.0 parts of the No.3 compound obtained in Example 1(3) was added in 100 parts of hot water having a temperature of about 85° C. To the solution was 10.0 parts of 28% aqueous ammonia added, followed by heating at 80–90° C., for 4 hrs for the reaction (during which the pH decreased from 11.0 to 8.5). To the reaction solution was 10.0 parts of 28% aqueous ammonia added, followed by putting at 85° C. for 3 hrs for the reaction (during which the pH decreased from 10.5 to 9.0). The reaction was confirmed to complete using HPLC (High Performance Liquid Chromatography). To the solution was 1.5 parts of Pearlite (trade name, diatom earth, made by Mitsui Kinzoku KK) added, followed by stirring at 60–65° C. for 15 min and filtering. To the filtrate was hot water added to adjust to a liquid amount of 200 parts, followed by heating to maintain the temperature to 60–65° C. To the solution were 30 parts of sodium chloride added at the same temperature and then a concentrated hydrochloric acid added to adjust the pH to 0.5 for crystallization. The solution, after stirring for 30 min, was filtered to give a wet cake of the No.5 compound. The wet cake was washed with 150 parts of methanol and dried to obtain the No.5 compound as a red crystal. λmax:523 nm (as an ammonium salt in the aqueous solution).

(2) The No.5 compound was conventionally used to prepare an ink, with which an image was printed out on the special paper (made by Seiko-Epson KK) using an ink-jet printer. The test showed that the recorded image had a good water fastness and light fastness.

Example 7

(1) A solution containing the No.3 compound obtained in Example 1(3) was heated to 85° C. To the solution was 10% aqueous sodium hydroxide added dropwise under stirring to maintain the pH to 11 at 85° C. for 2 hrs for the reaction. To the solution was 8.0 parts of Pearlite added, followed by stirring for 10 min and filtering. To the filtrate were a concentrated hydrochloric acid added to adjust the pH to 6–7 and then 80 parts of sodium chloride added under heating to maintain the temperature to 60–650° C., followed by stirring for 30 min for salting-out. The crystal thus obtained was filtered to separate and washed with 40 parts of 20% aqueous sodium chloride. A wet cake thus obtained was heated together with 400 parts of water to 60–65° C. To the solution was a concentrated hydrochloric acid added dropwise under heating to maintain the same temperature during 1.5 hrs, followed by adjusting the pH to 0.8 for crystallization. After stirring for 30 min, the crystal was filtered to obtain a wet cake of the No.4 compound.

The wet cake obtained in the above (1) was heated together with 300 parts of methanol, stirred at 60–65° C. for 1 hr, and filtered. The crystal was washed with 200 parts of methanol and dried to obtain 31.3 parts of the desalted product of the No.4 compound as a red crystal.

(2) The desalted product of the No.4 compound was conventionally used to prepare an ink, with which an image was printed out on the special paper (made by Canon KK) using an ink-jet printer. The test showed that the recorded image had a good water fastness and light fastness.

Example 8

(1) Preparation of an Ink

An ink for ink-jet printing of the present invention was produced by preparing the ink composition which contains the desalted product of the No.4 anthrapyridone compound obtained in Example 2 and has a composition as described in Table 2 below, and filtering it through a 0.45μm membrane filter.

TABLE 2

| Ink composition | |
| --- | --- |
| Dyestuff(No.4) | 7 parts |
| Water | 73 parts |
| Glycerin | 5 parts |
| Urea | 5 parts |
| N-methyl-2-pyrrolidone | 5 parts |
| Ethylene glycol | 5 parts |
| Total | 100 parts |

An ink-jetting ink for reference was produced in the same procedure as described above except that C.I.Acid Red was used in place of the No.4 anthrapyridone compound.

(2) Ink-jet Printing

By using an inkjet-printer (Trade name: BJF-600, made by Canon KK), ink-jet recording was done on an available glossy paper(Color BJ photo sheet film CA-101, made by Canon KK).

(3) Hue and Vividness of Recorded Image

A recorded paper was subject to color determination using the colorimeter (GREATAG SPM50, made by GREATAG Co.) to calculate $L^*$, $a^*$, $b^*$ values. Hue was evaluated by comparison with color samples of standard magenta in the "Japan Color Standard Paper" published by Japan Printing Machinery Manufacturers Association (JNC), and vividness $C^*$ was evaluated by the formula:

$$C^* = ((a^*)^2 + (b^*)^2)^{1/2}$$

The results are shown in Table 3.

(4) Light Fastness Test of Recorded Image

A carbon arc fade meter (by Suga Testing Machine Co.) was used to irradiate carbon arc on the recorded papers for 20 hours. Grade was determined according to JIS blue scale.

(5) Water Fastness Test of Recorded Image

A recorded paper was set for 60 min in a container whose space was saturated with water vapor at 100° C., and evaluated with respect to the influence by water (vapor) (ink bleeding from a printed region to non-printed regions). Evaluations were indicated by the following marks.

○: no bleeding observed

Δ: a moderate bleeding observed

X: a very big bleeding observed

The results in (1)–(5) are listed in Table 3.

TABLE 3

| | Hue | | | Vividness | Light fastness Judgment | Water fastness |
| --- | --- | --- | --- | --- | --- | --- |
| | L* | a* | b* | C* | (Grade) | Judgment |
| JNC Standard Magenta | 46.3 | 74.4 | −4.8 | 74.5 | — | — |
| No.4 of Example 2 | 48.4 | 81.0 | −3.9 | 81.1 | Grade 4 | ○ |
| Ink for Reference | 48.3 | 78.2 | 24.0 | 81.8 | Grade 4 | X |

Table 3 reveals that the ink composition of the present invention shows the values in color close to those of JNC standard magenta and suitable for an ink-jetting magenta ink, and that it can give a recorded image which has an excellent water fastness in a highly humid atmosphere.

Example 9

The following tests were conducted using the ink compositions as described below.

(1) Ink Compositions

Magenta ink

M1: the ink composition of the No.4 compound obtained in Example 2

M2: the ink composition for reference

Cyan ink

C1: the cyan ink composition containing C.I.Direct Blue 199(copper phthalocyanine type dyestuff)

(2) Ink-jet Printing

The printings were conducted with the magenta ink only or with the magenta ink and the cyan ink overlapped using an ink-jet printer on the glossy paper (Color BJ photo sheet film CA-101, by Canon KK) supplied with a dyestuff-acceptable layer to obtain the ink-jet printed matter.

(3) Light Fastness of Recorded (printed) Image

The recording paper printed in the above (2) was subject to a 40 hrs light fastness test using the acceleration type xenon light fastness tester made by WACOM. The overlappingly printed image showed an excellent light fastness.

(4) Determination of Color

Hues of the recorded image before and after the light exposure were measured to calculate the color difference (ΔE) using the above colorimeter. The results are shown in Table 4.

TABLE 4

| | Printing | Glossy paper(ΔE) |
| --- | --- | --- |
| 1 | M1 only | 16.5 |
| 2 | C1 overlapped on M1 | 15.4 |
| 3 | M2 only | 10.3 |
| 4 | C1 overlapped on M2 | 24.5 |

In comparison of 2(the present invention) with 4 (reference sample), both of which are blue colors obtained by double-printing (overlapping) cyan on magenta, 2 is apparently excellent because of a small ΔE. A combination of the cyan ink containing a water-soluble copper phthalocyanine with the conventional magenta ink gave a large color change to bring about troubles to use. The magenta ink of the present invention, even if combined with the cyan ink, can give a good balance and a small color change. It can give an excellent overlappingly printed image in light fastness.

Example 10

Yellow ink(Y), a magenta ink(M), and a cyan ink(C) were prepared according to the same procedure as in Example 8. Printings were conducted by overlapping them to obtain the recorded images, which were evaluated and compared in value with the respective standard colors in the above JNC "Japan Color standard Paper". The results were listed in Table 5, and the chromaticity diagram were shown in FIG. 1. Dyestuffs used in the respective inks were as follows:

Y: C.I.Direct Yellow 86

M: the dyestuff of the No.4 compound obtained in Example 2

C: C.I.Direct Blue 199

TABLE 5

|  | JNC Standard Dyestuff | | Dyestuff of the present invention for ink | |
| --- | --- | --- | --- | --- |
|  | a* | b* | a* | b* |
| Yellow | −6.6 | 91.1 | 12.9 | 107.8 |
| Red | 68.5 | 48.1 | 68.2 | 59.3 |
| Magenta | 74.4 | −4.8 | 81.0 | −3.9 |
| Blue | 20.0 | −51.0 | 26.9 | −53.5 |
| Cyan | −37.5 | −50.4 | −41.3 | −48.3 |

Table 5 reveals that the ink of the present invention, if used in combination with a magenta ink, a yellow ink or a cyan ink, can give the hue and the blend hue close to those of the JNC standard. The magenta dyestuff of the present invention is industrially highly useful.

INDUSTRIAL APPLICABILITY

The anthrapyridone compound of the present invention is excellent in water-solubility, stable in storage and characterized by having a good ability to filter through a membrane filter in the production process of an ink composition. The dyestuff of the compound is highly safe for a humane body. Furthermore, the ink composition of the present invention using the anthrapyridone compound does not show a crystal deposition after a long storage, a change in property and a color change even in a summer season, so that it has good storage stability. The ink composition of the present invention, when used as a magenta ink for ink-jet recording, can provide a printed matter with excellence in light fastness and water fastness. Furthermore, the composition also, when used together with a yellow, cyan or black dye, can give an ink-jet recorded matter that is excellent in light fastness and water fastness. The composition also, even when used together with a metal phthalocyanine type dyestuff as a cyan, can keep a light fastness and, additionally, provide a clear printed surface as well as an ideal magenta color. The composition, when used together with a yellow or cyan ink, can provide a wide visible ray range of color tone.

Therefore, the ink composition of the present invention is very useful as a magenta ink for ink-jet recording.

What is claimed is:

1. An anthrapyridone compound represented by Formula A-B or the salt thereof, wherein A is the dyestuff residue represented by Formula (1)

wherein $R_1$ is a hydrogen atom, an alkoxycarbonyl group or a benzoyl group and $R_2$ is a hydrogen atom or methyl group; and B is a hydrogen atom or a substituent group on the dyestuff residue A.

2. An anthrapyridone compound or the salt thereof according to claim 1, wherein said B is an acyl group, a substituted or unsubstituted benzene sulfonyl group, a substituted or unsubstituted alkyl sulfonyl group, or a group represented by Formula (2)

wherein each X and Y is independently a chlorine atom, hydroxyl group, amino group, monoethanolamino group, diethanolamiino group, morpholino group or anilino group which may have one or more substituents selected from the group consisting of sulfonate group, carboxyl group, methyl group and chlorine atom.

3. An anthrapyridone compound or the salt thereof according to claim 2, wherein said X is an anilino group which may have one or more substituents selected from the group consisting of sulfonate group and carboxyl group, and Y is a chlorine atom, hydroxyl group, amino group, monoethanolamino group, diethanolamino group or morpholino group.

4. An anthrapyridone compound or the salt thereof according to claim 2, wherein B is a benzene sulfonyl-group, tosyl group, 2-carboxy-benzoyl group or 3,4-dicarboxy-benzoyl group.

5. An anthrapyridone compound or the salt thereof according to claim 1, wherein said $R_1$ is a hydrogen atom and $R_2$ is a methyl group.

6. A water-based magenta ink composition which comprises the anthrapyridone compound or the salt thereof according to any one of claims 1 to 5.

7. A water-based magenta ink composition according to claim 6, wherein said composition contains water and an organic solvent.

8. A water-based magenta ink composition according to claim 6 or 7, wherein the content of inorganic salt included in said anthrapyridone compound or the salt thereof is 1% by weight or less.

9. A water-based magenta ink composition according to any one of claim 6 to 8, wherein said composition is one for ink-jet recording.

10. A method for ink-jet recording which comprises using the water-based magenta ink composition according to any one of claim 6 or 8 as an ink, in the recording method that ink droplets are ejected responding to record signals to record onto a recording material.

11. A method for ink-jet recording which comprises using both the water-based magenta ink composition according to any one of claim 6 or 8 as an magenta ink and a water-based ink containing water-soluble metal phthalocyanine dyestuff as a cyan ink, in the recording method that ink droplets are ejected responding to record signals to record onto a recording material.

12. A method for ink-jet recording according to claim 11, wherein said recording material is an information transmission sheet.

13. A method for ink-jet recording according to claim 12, wherein said information transmission sheet is a surface-treated sheet.

14. An ink-jet printer which comprises being equipped with both a container receiving the water-based magenta ink composition according to any one of claim 6 or 8 and a container receiving the water-based cyan ink composition containing water-soluble metal phthalocyanine dyestuff.

15. An anthrapyridone compound or the salt thereof according to claim 1, wherein $R_1$ is a hydrogen atom or a lower alkoxycarbonyl group; $R_2$ is a methyl group and B is a hydrogen atom or a C1–C4 alkoxycarbonyl group.

\* \* \* \* \*